Jan. 22, 1946.   E. P. SEXTON   2,393,425
RESERVOIR ARRANGEMENT
Filed Dec. 23, 1943
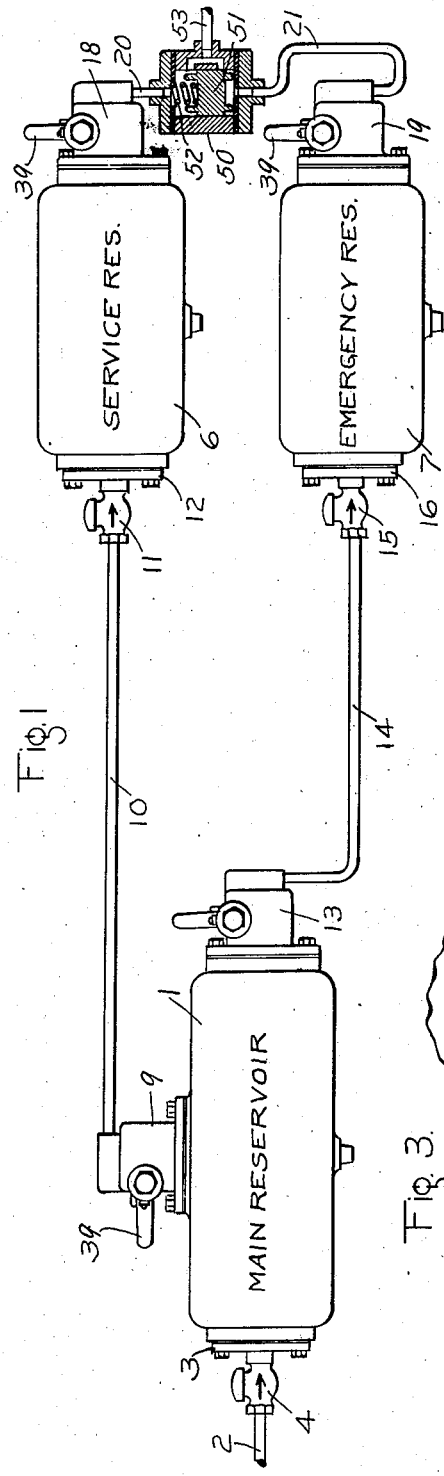
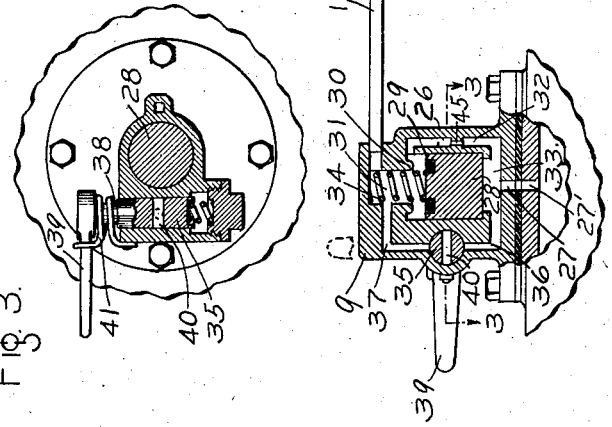
INVENTOR
EVERETT P. SEXTON
BY
ATTORNEY Patented Jan. 22, 1946

2,393,425

UNITED STATES PATENT OFFICE 2,393,425

RESERVOIR ARRANGEMENT

Everett P. Sexton, East McKeesport, Pa., assignor to The Westinghouse Air Brake Company, Wilmerding, Pa., a corporation of Pennsylvania Application December 23, 1943, Serial No. 515,383

5 Claims. (Cl. 303—85)

This invention relates to a fluid pressure supply system and more particularly to the type embodying a plurality of separate sources of fluid under pressure and/or a plurality of separate fluid pressure conveying or control pipes, such for instance as used in fluid pressure supply systems on airplanes as shown in the Rankin J. Bush application, Serial No. 480,161, filed March 23, 1943.

One object of the invention is to provide a fluid pressure supply system such as above mentioned embodying means operable upon failure of any one controlling pipe to isolate such pipe so as to in no way interfere with the supply of fluid under pressure to other parts of the system.

Another object of the invention is to provide a fluid pressure supply system of the above mentioned type which embodies a plurality of sources of fluid under pressure in order to insure the desired supply of fluid under pressure to a fluid pressure supply pipe in case of failure of one or another of said sources.

Other objects and advantages will be apparent from the following more detailed description of the invention.

In the accompanying drawing; Fig. 1 is a diagrammatic view of a portion of a fluid pressure supply system embodying the invention; Fig. 2 is an enlarged sectional view of a portion of the fluid pressure supply system illustrated in Fig 1; and Fig. 3 is a sectional view taken along the line 3—3 of the protection or cut off valve device shown in Fig. 2.

The portion of the fluid pressure supply system shown in Fig. 1 of the drawing comprises a main reservoir 1 arranged to be supplied with fluid under pressure through a pipe 2 leading from an air compressor (not shown) or from any other suitable fluid pressure supply source. Secured to the reservoir 1, by means of a flange 3, and connected to a fluid pressure supply pipe 2, is a one-way flow check valve device 4, which is provided to prevent loss of fluid under pressure from the reservoir in case of breakage of pipe 2.

The system further comprises a service reservoir 6 and a supplemental or emergency reservoir 7 which are connected in parallel to the main reservoir 1. As shown in Fig. 1, the main reservoir 1 is connected to the service reservoir 6 by way of a protection or cut off valve device 9 secured to and carried by the main reservoir, a pipe 10 and a one-way flow check valve device 11 carried by a flange 12 secured to the service reservoir. The main reservoir is connected to the emergency reservoir 7 by way of a protection valve device 13 secured to and carried by the main reservoir, a pipe 14 and a one-way flow check valve device 15 carried by a flange 16 secured to the emergency reservoir.

The service and emergency reservoir 6 and 7 are provided with protection or cut off valve devices 18 and 19, respectively, which devices are connected to opposite ends of a double check valve device 50 by means of pipes 20 and 21 respectively.

The double check valve device 50 contains a movable double seating piston valve 51 which is subject on one side to the combined pressures of fluid in a chamber and a biasing spring 52 and subject on the other side to pressure of fluid in a chamber. This check valve device is provided to control communication between a supply pipe 53 through which fluid under pressure is discharged from either the pipe 20 or the pipe 21 for use in a fluid pressure controlled apparatus.

The check valve devices 4, 11 and 15 carried by the flanges 3, 12 and 16, respectively, are identical in structure, each comprising, as illustrated in Fig. 2 of the drawing, a casing in which there is mounted a check valve 22 of the usual well known type. Each of the flanges 3, 12, and 16 is provided with a central passage 24 which is open to the outlet chamber 23 of the check valve device and which when said plate is attached to the reservoir, is in alignment with a supply passage 25 leading to the interior of the reservoir.

The protection or cut off valve devices 9, 13, 18 and 19 are also identical each comprising, as illustrated in Fig. 2 of the drawing, a body casing 26 which is arranged to be suitably secured to the desired reservoir and which is provided with fluid pressure supply passage 27 which registers with a passage 27' leading from the interior of the reservoir. Since, as already mentioned, the protection or cut-off valve devices are identical a description of one will be sufficient for a clear understanding of the invention.

Contained in the casing 26 is a valve piston 28 having at one end a sealing gasket 29 which is arranged to seat against a seat rib 30 surrounding an outlet chamber 31 for closing communication between said outlet chamber and a passage 32 which is in constant open communication with the interior of the reservoir by way of a chamber 33, at the opposite end of the valve piston, and supply passage 27.

Contained in outlet chamber 31 and operatively engaging a spring seat provided on said one end of the valve piston and the inner wall of the casing is a spring 34, which tends, at all times, to urge said valve piston to a normal or open position, in which position it is shown in Fig. 2 of the drawing.

Mounted in the casing 26 is a rotatable plug valve 35 having a normal or closed position, in which it is shown in the drawing, for cutting off communication between a passage 36 provided in the casing and leading to the chamber 33, and a passage 37 provided in the casing and leading to the outlet chamber 31.

The plug valve 35 is provided with a stem 38 which, as best shown in Fig. 3 of the drawing, extends to the exterior of the casing. Secured to the outer end of the stem 38 is a handle 39 which is manually operative to rotate said stem and thereby the plug valve from its normal position, in which it is shown, to a position in which a through port 40 in said valve aligns with passages 36 and 37 to establish communication between chambers 31 and 33.

Surrounding the stem 38 is a spring 41 which at one end is attached to the handle 39 and at its opposite end is secured to the casing 26, which spring tends at all times, to urge the handle and thereby the plug valve to its normal position.

Assuming that the operating parts of the protection or cut off valve devices 9, 13, 18 and 19 are all positioned as illustrated in Fig. 2 of the drawing. Under these conditions the plug valve 35 in each device will be positioned to cut off communication between the reservoir and the outlet passage of the protection valve device with which it is associated. The spring 34 in each device will maintain the valve piston 28 in its open position so that communication between the interior of the reservoir, with which the device is associated, and the outlet chamber 31 of the device is open by way of supply passages 27 and 27', chamber 33 in the protection valve device and passage 32.

With the service reservoir 6 and the emergency reservoir 7 both devoid of fluid under pressure, the biasing spring 52 in the double check valve device 50 will maintain the piston 51 in the position in which it is shown, so that the supply pipe 53 is disconnected from pipe 21 and connected to pipe 20.

Fluid under pressure for charging the reservoirs 1, 6 and 7 and the supply pipe 53 flows by way of pipe 2 and check valve 4 to the main reservoir 1 from whence it flows to the chamber 33 in each of the protection valve devices 9 and 13. The flow of fluid under pressure from the main reservoir 1 to chamber 33 in each protection valve device is by way of the supply passages 27 and 27' in the device and reservoir, respectively.

Fluid under pressure thus supplied to chamber 33 in the protection valve device 9 will freely flow from said chamber to the service reservoir 6 by way of passage 32 in the protection valve device 9, outlet chamber 31, pipe 10 and check valve 11, while fluid under pressure supplied to chamber 33 in the protection valve device 13 will freely flow from said chamber to the emergency reservoir 7 by way of passage 32 and outlet chamber 31 in the protection valve device 13 and check valve 15.

Fluid under pressure thus supplied to the service reservoir 6 and emergency reservoir 7 flows therefrom to opposite sides of the piston valve 51 in the double check valve device 50 by way of pipes 20 and 21, respectively. Since the pressures of fluid supplied to opposite ends of the piston valve 51 are substantially equal, the biasing spring 52 serves to maintain the piston valve 51 in the position shown thus fluid under pressure flows from pipe 20 to pipe 53 so long as the pressure of fluid in pipe 21 and acting on the opposite end of the piston does not exceed the combined pressure of spring 52 and the pressure of fluid in pipe 20.

It should here be understood that in the passage 32 of each protection valve device there is a choke 45, as shown in Fig. 2 which has such a flow area as to permit of the normal flow of fluid under pressure from the chamber 33 to the outlet chamber 31. The spring 34 in each device will maintain the valve piston 28 open so long as the pressure in the outlet chamber 31 and the respective pipe 10, 14, 20, or 21 is within a certain degree of that in the associated reservoir. In the event of the rupture of pipe 10, 14, 20 or 21, the pressure of fluid in the outlet chamber 31 of the respective protection valve device will reduce at a rate exceeding the supply to said chamber through the choke 45. As a result the pressure of fluid in the outlet chamber 31 becomes reduced sufficiently below that in chamber 33, acting on the opposite end of the valve piston, to provide a differential in fluid pressures on the valve piston which will overcome the pressure of spring 34. When this occurs the valve piston 28 will be moved, by the pressure of fluid in chamber 33 and the associated reservoir, into sealing engagement with the rib 30 and thus close communication between the reservoir and pipe and prevent loss of fluid under pressure from the reservoir.

In the event of the rupture of pipe 20, the protection valve device 18 will close as above described and thus prevent loss of fluid under pressure from the service reservoir 6. When this rupture occurs, the pressure of fluid acting on the upper end of the piston valve 51 of the check valve device 50 will be suddenly reduced so that the pressure of fluid in pipe 21 acting on the lower end of the piston valve will move the piston valve in an upwardly direction, as viewed in the drawing, against the opposing force of spring 52 to disconnect supply pipe 53 from pipe 20 and connect said supply pipe to pipe 21. With this latter connection established, the supply of fluid under pressure to the supply pipe 53 will be maintained from the emergency reservoir 7. In case pipe 21 should become ruptured, while the piston valve 51 of the double check valve device 50 is in the position shown, the protection valve device 19 will close and prevent loss of fluid under pressure from the emergency reservoir 7 and the supply of fluid under pressure to supply pipe 53 will be maintained from the service reservoir 6 in the manner hereinbefore described.

If pipe 10 between the main reservoir 1 and the service reservoir 6 should become ruptured, the cut off valve device 9 will close and prevent loss of fluid from the main reservoir through the ruptured pipe, and check valve device 11 will act to prevent the escape of fluid under pressure from the service reservoir and thus permit the stored fluid under pressure in the service reservoir to be used. It will be understood that when the pressure of fluid in the service reservoir 6 has been reduced to a degree sufficient to permit the emergency reservoir pressure acting in pipe 21 to operate the piston valve 51 of the double check valve device 50 from the position in which it is shown to its other position, said piston establishes a connection between the pipe 21 and thereby the emergency reservoir 7 to the supply pipe 53. Thus the supply pressure in pipe 53 will be maintained from the emergency reservoir.

The protection valve device 13 and check valve device 15 will act in a like manner to prevent loss of fluid under pressure from the emergency reservoir 7 in case of rupture of the pipe 14. In this case the supply of fluid under pressure to pipe 53 will be maintained from the service reservoir through pipe 20 and double check valve device 50. The check valve device 4 will, as already mentioned, act to bottle the fluid under pressure in the main reservoir in case of rupture of the pipe 2. It will thus be seen that the possibility of loss of fluid under pressure from the fluid pressure supply system is reduced to a minimum. It will also be noted that the supply of fluid under pressure to a fluid pressure controlled system by way of supply pipe 53 is obtained from the reservoirs 6 and 7 through pipes 20 and 21, respectively, so that as long as there is a supply of fluid in either of said reservoirs the flow of fluid to the fluid pressure controlled system is insured.

In case one of the pipe 10, 14, 20 or 21 should break and cause closure of the respective cut-off valve device, then in order to effect movement of the valve piston 28 therein back to its normal open position, after the damaged pipe has been repaired or replaced, it is necessary to reduce the differential in fluid pressure acting on said piston valve to a degree less than the opposing forces of spring 34. In a structure such as illustrated where one end of the valve piston is constantly subject to pressure of fluid in the reservoir this must be accomplished by increasing the pressure of fluid on the opposite or spring engaged end of the valve piston.

For increasing the pressure of fluid on the spring engaged end of valve piston 28 to effect movement thereof to its open position, the handle 39 is rotated from its normal position in a clockwise direction to a position in which port 40 in the plug valve 35 registers with the passages 36 and 37 in the casing to establish communication between chambers 31 and 33 at opposite ends of the piston valve 28. With communication thus established between chambers 31 and 36, fluid under pressure in chamber 33 and the associated reservoir flows to chamber 31 by way of passage 36, port 40 in the plug valve 35 and passage 37 thus by-passing fluid under pressure around the valve piston 28. When the pressure of fluid on opposite ends of the valve piston 28 has been substantially equalized, the spring 34 will act to move the valve piston back to its open position. Upon manual release of the handle 39, spring 41 will act to rotate the handle and thereby the plug valve in a counter-clockwise direction to its normal position, thus cutting off communication between passages 36 and 37. Now the flow of fluid under pressure from the reservoir to the associated pipe will be by way of chamber 33, passage 32 and outlet chamber 31.

From the foregoing it will be seen that the fluid pressure system comprises a plurality of sources of fluid under pressure, so that in case of failure of one source the apparatus dependent on fluid under pressure for control by way of pipe 53 may be controlled by fluid under pressure from the other source or sources to thereby minimize the possibility of failure of the supply of fluid to the pipe 53 and apparatus to be controlled. In order to further minimize the possibility of failure of the apparatus dependent on fluid under pressure, a cut off or protection valve device and a one way flow check valve are provided in the various control pipes thereof so that in case of breakage of one of said pipes loss of the fluid uner pressure supply through the break will be prevented to thereby insure against loss of fluid from other parts of the system.

It will also be noted that this improved fluid pressure control system provides maximum protection against loss of control fluid under pressure since, in the event of failure of the pipe between either the main reservoir and service reservoir or between the main reservoir and the emergency reservoir, the supply of fluid under pressure in both the service and emergency reservoir is available, and that the pressure of fluid in one or the other of said reservoirs will be maintained. In the event of failure of the pipe between the source of fluid under pressure and the main reservoir, the fluid under pressure in the charged reservoir will still be available for use.

Having now described my invention, what I claim as new and desire to secure by Letters Patent, is:

1. A system for maintaining a supply of fluid under pressure to a fluid pressure supply pipe comprising in combination with said pipe, two auxiliary reservoirs, a double check valve device having a normal position for connecting one of said reservoirs to and for isolating the other of said reservoirs from said pipe and movable by the pressure of fluid supplied thereto from said other reservoir to another position upon failure in the supply of fluid under pressure thereto from said one reservoir for connecting said other reservoir to and for isolating said one reservoir from said pipe, a main reservoir, independent means including a pipe connecting each of said auxiliary reservoirs to said main reservoir, and cut-off valve means associated with said main reservoir in the connection to each independent means operable by the pressure of fluid in the respective pipe when intact to open communication between the main reservoir and the pipe and operable automatically upon a certain rate of reduction in pressure in the respective pipe incident to the rupture thereof to close said communication.

2. A system for maintaining a supply of fluid under pressure to a fluid pressure supply pipe comprising in combination with said pipe, two auxiliary reservoirs, a double check valve device having a normal position for connecting one of said reservoirs to and for isolating the other of said reservoirs from said pipe and movable by the pressure of fluid supplied thereto from said other reservoir to another position upon failure in the supply of fluid under pressure thereto from said one reservoir for connecting said other reservoir to and for isolating said one reservoir from said pipe, a main reservoir, independent means including a pipe connecting each of said auxiliary reservoirs to said main reservoir, a check valve associated with each auxiliary reservoir for preventing back flow from the associated reservoir to the respective pipe when the pressure in the pipe is lower than that in the reservoir, and a cut-off valve associated with said main reservoir in the connection to each independent means operable by the pressure of fluid in the respective pipe when intact to open communication between the main reservoir and the pipe and operable automatically upon a certain rate of reduction in pressure in the pipe incident to rupture thereto to close said communication.

3. A system for maintaining a supply of fluid under pressure to a fluid pressure supply pipe comprising in combination with said pipe, two auxiliary reservoirs, a double check valve device, a fluid conducting conduit connecting one of said reservoirs to one end of said check valve device and another fluid conducting conduit connecting the other of said reservoirs to the opposite end of said check valve, said check valve device having a normal position for connecting said one fluid conducting conduit and thereby said one reservoir to, and for isolating the other of said fluid conducting conduits and thereby the other of said reservoirs from, said pipe and movable by the pressure of fluid supplied thereto from said other reservoir to another position upon a predetermined reduction of the pressure of fluid in said one conduit for connecting said other conduit and thereby said other reservoir to, and for isolating said one conduit from, said pipe, a main reservoir, a separate fluid conducting conduit connecting each of said auxiliary reservoirs to said main reservoir, and a cut-off valve device associated with each auxiliary reservoir and said main reservoir in the connection from each reservoir to the respective fluid conducting conduit operable by the pressure of fluid in the respective conduit when intact to open communication between the reservoir with which it is associated and the respective conduit and operable automatically upon a certain rate of reduction in pressure in the respective conduit incident to rupture thereof to close said communication.

4. A system for maintaining a supply of fluid under pressure to a fluid pressure supply pipe comprising in combination with said pipe, two auxiliary reservoirs each having an inlet communication and an outlet communication, a check valve associated with each reservoir constituting a portion of the inlet communication thereto providing for flow of fluid under pressure only in the direction of the reservoir, a cut-off valve device associated with each reservoir constituting a portion of the outlet communication therefrom operative upon a certain rate of reduction in the pressure of fluid in the communication leading therefrom to close the communication and thereby prevent loss of fluid from the pressure, a double check valve device, two pipes one connecting one of said cut-off valve devices with one end of said double check valve device and the other connecting the other cut-off valve device with the opposite end of said check valve device, said check valve device normally establishing communication between one of said pipes and the supply pipe and operable automatically upon a reduction in pressure in the normally connected pipe incident to rupture thereto to connect the other of said pipes to said supply pipe, a main reservoir, a separate communication connecting each of said auxiliary reservoirs with said main reservoir for maintaining both of said auxiliary reservoirs charged with fluid under pressure.

5. The combination with a plurality of reservoirs each having an inlet communication and an outlet communication, a check valve secured directly to each reservoir and constituting a portion of the inlet communication thereto and a cutout valve device secured directly to each of said reservoirs and constituting a portion of the outlet communication therefrom, said check valve preventing back flow from the reservoir to which it is attached when the pressure in the respective communication is lower than in the reservoir, a pipe connecting the cut-off valve device of one reservoir with the check valve device connected to the other reservoir, said cut-off valve device being normally open to permit flow of fluid from one of the reservoirs to another reservoir and being operative upon a certain rate of reduction of the pressure of fluid in said pipe for cutting off the flow of fluid from the reservoir to which it is attached.

EVERETT P. SEXTON.